United States Patent
Ho et al.

(10) Patent No.: US 9,678,102 B2
(45) Date of Patent: Jun. 13, 2017

(54) CALIBRATING INTERTIAL SENSORS USING AN IMAGE SENSOR

(71) Applicant: Google Inc., Mountain View, CA (US)

(72) Inventors: Harvey Ho, Mountain View, CA (US); Charles Campbell Rhodes, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/192,727

(22) Filed: Jun. 24, 2016

(65) Prior Publication Data

US 2017/0089948 A1 Mar. 30, 2017

Related U.S. Application Data

(63) Continuation of application No. 13/289,321, filed on Nov. 4, 2011, now abandoned.

(51) Int. Cl.
*G01P 21/00* (2006.01)

(52) U.S. Cl.
CPC .................... *G01P 21/00* (2013.01)

(58) Field of Classification Search
CPC ...................................... G01P 21/00
USPC ........................................... 702/96
See application file for complete search history.

(56) References Cited

U.S. PATENT DOCUMENTS

| 8,762,091 B1 | 6/2014 | Foxlin et al. |
| 2010/0088027 A1 | 4/2010 | Bye |
| 2012/0078510 A1 | 3/2012 | Ma et al. |
| 2012/0203487 A1 | 8/2012 | Johnson et al. |
| 2012/0323515 A1 | 12/2012 | Liu et al. |

OTHER PUBLICATIONS

Andrew Fitzgibbon, Microsoft Research, http://research.microsoft.com/en-us/um/people/awft, Aug. 6, 2011.
David Nister Research, David Nister's Research Page, http://www.vis.uky.edu/~dnister/Research/research.html, Mar. 6, 2011.
Diel et al., Epipolar Constraints for Vision-Aided Inertial Navigation, Proc. 7th IEEE Workshop on Applications of Computer Vision / IEEE Workshop on Motion and Video Computing (WACV/MOTION 2005), Jan. 2005, pp. 221-228.

(Continued)

*Primary Examiner* — Ricky Ngon
(74) *Attorney, Agent, or Firm* — McDonnell Boehnen Hulbert & Berghoff LLP (57) ABSTRACT

A method is provided for calibrating an inertial sensing unit of a device utilizing a vision sensing unit integral to the device. The method includes receiving inertial sensing input data from the inertial sensing unit, receiving vision sensing input data from the vision unit, and determining when the received vision sensing input data represents a predetermined input state of the vision sensing unit. The method includes estimating an error value in the inertial sensing input data received from the inertial sensing unit based on the received vision sensing input data upon determination that the received vision sensing input data represents the predetermined vision sensing input state. The method further includes adjusting first subsequent received inertial sensing input data from the inertial sensing unit based on the estimated error value, thereby calibrating the inertial sensing unit.

18 Claims, 7 Drawing Sheets

(56) References Cited

OTHER PUBLICATIONS

Foxlin et al., VIS-Tracker: A Wearable Vision-Inertial Self-Tracker, Proceedings of the Virtual Reality 2003 Conference (VR'03), IEEE Computer Society.
Georg Klein Home Page, Home Publications Vids on youtube Source Code PTAM Blog, http://www.robots.ox.ac.uk/~gk/, Aug. 6, 2011.
Lang et al., Calibration of Hybrid Vision / Inertial Tracking Systems, Proceedings of the 2nd InerVis: Workshop on Integration of Vision and Inertial Sensors, Barcelona, Spain, Apr. 18, 2005.
Looney, A Simple Calibration for Mems Gyroscopes, EDN Europe, Jul. 2010, www.den-europe.com.
Qian et al., Robust structure from motion estimation using inertial data, J. Opt. Soc. Am. A/vol. 18, No. 12/Dec. 2001, pp. 2982-2997.
Randeniya et al., Calibration of inertial and vision systems as a prelude to multi-sensor fusion, ScienceDirect, Transportation Research Part C 16 (2008) 255-274.
Rehbinder et al., Rigid body state estimation using dynamic vision and inertial sensors, Proceedings of the 40th IEEE Conference on Decision and Control, Orland, Florida USA, Dec. 2001, pp. 2398-2403.
Strelow et al., Online Motion Estimation from Image and Inertial Measurements, Carnegie Mellon University.
Strelow et al., Optimal motion estimation from visual and inertial measurements, Proceedings of the Sixth IEEE Workshop on Applications of Computer Vision (WACV'02).
Voodoo Camera Tracker: A tool for the integration of virtual and real scenes, Version 1.1.0 beta for Linux and Windows, http://www.digilab.uni-hannover.de/docs/manual.html, Aug. 6, 2011.
Welch et al., An Introduction to the Kalman Filter, TR 95-041, Department of Computer Science, University of North Carolina at Chapel Hill, Updated Jul. 24, 2006, http://www.cs.unc.edu/~welch.
You et al., Fusion of Vision and Gyro Tracking for Robust Augmented Reality Registration, Proceedings of the Virtual Reality 2001 Conference (VR'01), IEEE Computer Society.

CALIBRATING INTERTIAL SENSORS USING AN IMAGE SENSOR

CROSS REFERENCE TO RELATED APPLICATIONS

This application is a continuation of co-owned U.S. patent application Ser. No. 13/289,321 filed on Nov. 4, 2011, the entirety of which is incorporated by reference herein for all purposes.

BACKGROUND

Unless otherwise indicated herein, the materials described in this section are not prior art to the claims in this application and are not admitted to be prior art by inclusion in this section.

An inertial measurement unit (IMU) is an electronic device that measures and reports on a velocity and orientation of an apparatus or a vehicle using a combination of accelerometers, gyroscopes, and magnetometers. Recently, inertial navigation systems (INSs) have been widely used for estimating the motion of vehicles moving in a three dimensional (3-D) space, such as airplanes and automobiles, for example. An important element of most INSs is an IMU configured to measure linear accelerations and rotational velocities, which enable the INS to track the position and velocity of the corresponding vehicle. However, a major disadvantage of using IMUs for navigation or tracking purposes is that they typically suffer from accumulated error. This error accumulation leads to a drift in the inertial measurements provided by the IMU, which translates into an ever-increasing gap between the estimated location of the vehicle and its actual location.

Therefore, there exists a need for a system, using an IMU, which mitigates the above-discussed the measurement drift issues, thereby enabling a more accurate determination of inertial displacements of the associated apparatus or vehicle.

SUMMARY

Disclosed herein are improved methods, systems, and devices for calibrating inertial sensors via a vision sensor to help minimize drifting errors affecting measurements of the inertial sensors.

As stated above, IMUs typically accumulate measurement errors, which may lead to a drift in the inertial measurements provided to a computing system. As such, in accordance with the disclosure, in addition to the IMU, the computing system is provided with a measurement source, which serves to calibrate the inertial sensor, thereby helping to mitigate the measurement drift.

In one embodiment, the computing system, which includes an inertial sensor, is provided with a vision sensor, as the additional measurement source. Based on this configuration, the computing system is configured to receive inertial sensing input data from the inertial sensor, and vision sensing input data from the vision sensor. In order to calibrate the inertial sensor, the computing system implements a method, which monitors an input state of the vision sensor to determine when the received vision sensing input data represents a predetermined input state of the vision sensor. Upon that determination, an error value is estimated in the inertial sensing input data based on the received vision sensing input data. The method further includes adjusting subsequent received inertial sensing input data from the inertial sensor based on the estimated error value, thereby calibrating the inertial sensor.

In another embodiment, an inertial sensor is inactive, and the act of invoking the process of using input data from a vision sensor as the basis to calibrate the inertial sensor includes the function of activating the inertial sensor. While the inertial sensor is inactive, the system determines when the received vision sensing input data represents a predetermined input state of the vision sensor. Upon that determination, the system initiates a state switch of the inertial sensor from the inactive state to an active state. Once active, the inertial sensor provides inertial sensing input data to the computing system, which then proceeds to estimate an error value in the provided inertial sensing input data. Based on the estimated error value, the system adjusts subsequent received inertial sensing input data, thereby calibrating the inertial sensor.

In another embodiment, a non-transitory computer readable storage medium contains instructions that cause the computing system to perform the above-discussed processes for calibrating inertial sensors utilizing a vision sensor.

In yet another embodiment, the device, which includes the above discussed computing system, is a head-wearable display device, which in turn includes a display element for displaying graphical images, an image presenting unit for presenting the graphical images on the display element, an inertial sensor operable to sense inertial movements of the head-wearable display device, and a vision sensor operable to provide vision sensing input data. The head-wearable device further includes a memory unit storing program instructions executable to perform a method for calibrating the inertial sensor utilizing the vision sensor, and a processor operatively coupled to the memory, the image presenting unit, the inertial sensor, and the vision sensor, and configured to execute the method.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the invention by way of example only and not by way of limitation.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The methods, systems, and apparatuses or devices disclosed herein generally relate to minimizing drift or bias error in measurements provided by inertial sensors. In one embodiment, an apparatus or system includes a plurality of inertial sensors (e.g., an accelerometer, a gyroscope, and a magnetometer), a vision sensor (e.g., a video camera), and a processing unit programmed with application logic that makes use of the vision measurements or data provided by the vision sensor to improve the inertial measurements or data provided by the inertial sensors, thereby improving accuracy of useful output provided by the system. In general, some or all of the inertial sensors in such a system may have bias values (perhaps one bias value per axis) that vary over time, due to aging/wear, electrical noise, local magnetic effects, thermal variations, and other conditions.

As a general matter, to help ensure accurate output, when an application on such a system receives measurements from active or invoked inertial sensors and from the vision sensor, the application may apply a filtering algorithm that works over time to statistically evaluate and refine the received inertial measurements based on vision measurements from the vision sensor. In operation, such a filtering algorithm may internally generate estimates of inertial sensor bias values, covariance values, and other variables, and may improve those estimates over time as the filtering algorithm receives and operates on more and more inertial and vision sensor measurements. Thus, as the filtering algorithm continues to run, the accuracy of the measurements of the inertial sensors may continue to improve.

In accordance with the disclosure, an application that makes use of multiple inertial sensors could invoke a vision sensor for purposes of estimating and minimizing measurement bias errors affecting at least one of the multiple inertial sensors. For instance, an application that normally makes use of just a gyroscope and not a camera could be arranged to automatically invoke a camera so that angular movement (panning) in video signals received by the camera can be compared with gyroscope readings to help estimate and minimize one or more bias error values for the gyroscope. To improve the accuracy of the measurements of the gyroscope, the application implements a filtering algorithm, which by receiving more and more measurement data over time from both the gyroscope and the camera improves the estimation and minimization of the gyroscope bias error values.

Figure 1:
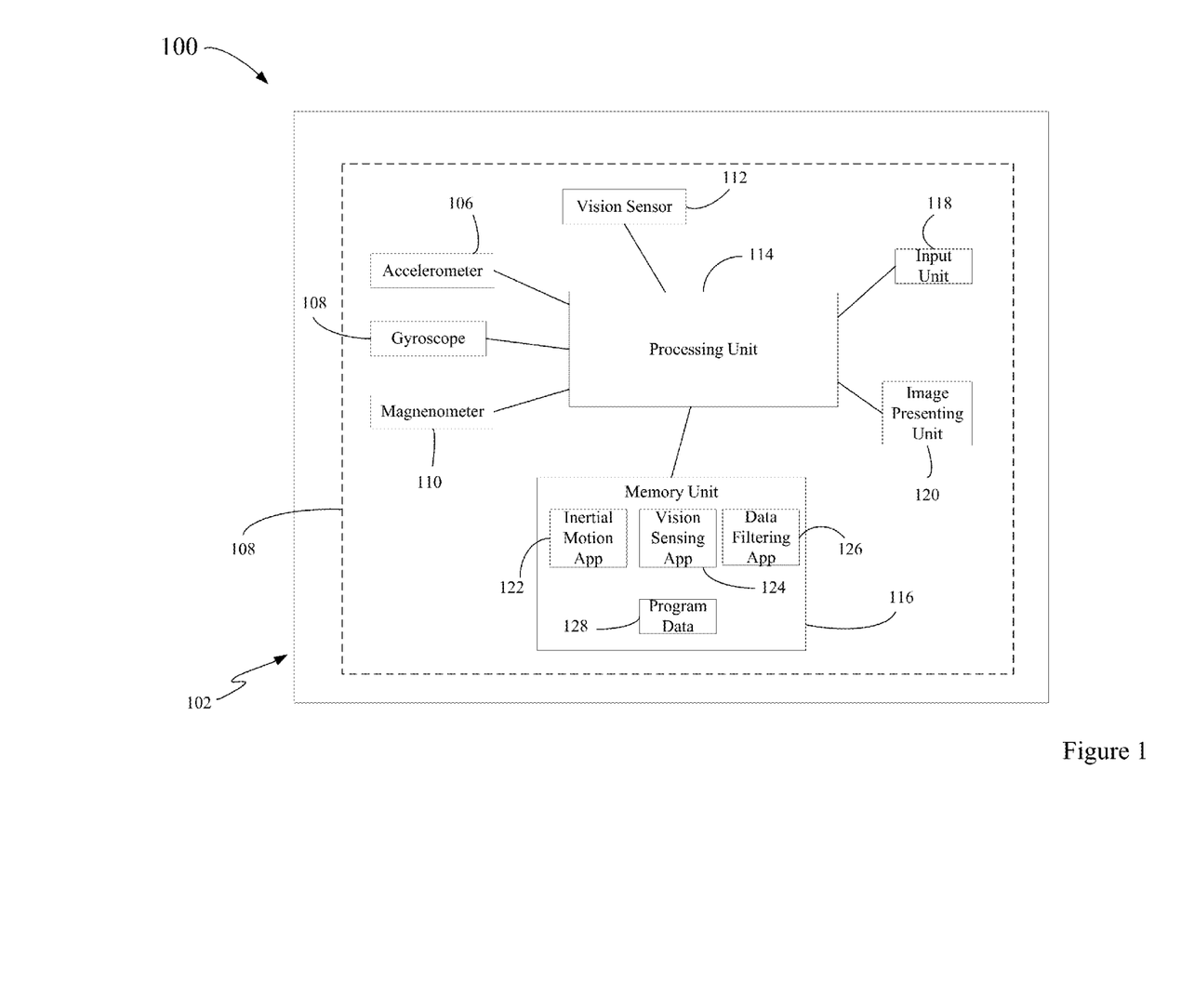
FIG. 1 is a block diagram illustrating an embodiment of a device including a plurality of inertial sensors and a vision sensor.

Referring to FIG. 1, a block diagram 100 illustrates an exemplary end user device 102, which includes a computing system 104 used for implementing a method for calibrating inertial sensors. Computing system 104 includes a plurality of inertial sensors or sensing units, such as an accelerometer 106, a gyroscope 108, and a magnetometer 110. Computing system 104 also includes an image or vision sensor 112. Typically, accelerometers and gyroscopes can be implemented using piezo systems, micro-electro-mechanical systems, and laser sensing mechanisms, for example. Magnetometers can be implemented using hall effect sensors, and magnetoresistive elements. Sensors 106-112 are operatively connected to a processing unit 114, which is in turn coupled to or integral with a memory unit 116, an input unit 118, and an image presenting system 120. In one embodiment, image presenting system 120 may include a projecting unit and a display unit (both not shown).

In one embodiment, inertial sensors 106-110 can be implemented as micro or miniature piezoelectric sensors. In another embodiment, inertial sensors 106-110 can be implemented as micro-electrical-mechanical system (MEMS) sensors. In still another embodiment, some of the inertial sensors 106-110 can be implemented as other sensor types, such as laser gyroscopes, for example. In addition, in one embodiment, vision sensor 110 is a video camera, such as a charge coupled device (CCD) camera or a complementary metal oxide semiconductor (CMOS) camera, for example. As known to one of ordinary skill in the art, some CCD and CMOS cameras typically use the same kind of vision element, namely a photo diode.

Processor unit 112 is configured to execute instructions and to carry out operations associated with computing system 104. For example, using instructions retrieved from memory unit 116, the processor unit may control the reception and manipulation of input and output data between components of computing system 104. The processing unit may include an integrated circuit that can be configured by the user, such as a field-programmable gate array (FPGA). The FPGA configuration is generally specified using a hardware description language (HDL). The processor unit can be implemented on a single-chip, multiple chips or multiple electrical components. For example, various architectures can be used for processor unit 112, including dedicated or embedded processor or microprocessor (µP), single purpose processor, controller or a microcontroller (µC), application-specific integrated circuit (ASIC), any combination thereof, and so forth. In most cases, the processor unit together with an operating system operates to execute computer code and produce and use data.

Memory unit 116 generally provides a place to store computer code and data that are used by computing system 104. The memory unit may include but not limited to non-volatile memory, such as read-only memory (ROM, flash memory, etc.), volatile memory, such as random-access memory (RAM), a hard disk drive and/or the like. Memory unit 116 includes an inertial motion sensing application 122, and a vision sensing data application 124, a data filtering application 126, and program data 128. Inertial motion sensing application is configured to activate and deactivate inertial sensors 106-110 as dictated by particular applications, and to convert analog or digital inertial signals, generated by sensors 106-110, into inertial motion input data that are communicated to processing unit 114. Vision sensing data application 124 is configured to activate and deactivate vision sensor 112 as dictated by particular applications, and to convert generated digital vision signals into vision input data that are communicated to processing unit 114. Data filtering application 126 is configured to filter inertial motion sensing data in order to minimize inertial sensor bias values based on vision sensing data, in accordance with the present disclosure. In some example embodiments, applications 122-126 can be configured to operate with program data 128 on a suitable operating system (not shown). Operating systems are generally well known and will not be described in greater detail. By way of example, the suitable operating system may correspond to Windows 7, Mac OS, Google Chrome OS, Palm OS Cobalt (6.0), Android, Symbian Belle, BlackBerry OS, and the like. The suitable operating system can also be a special purpose operating system, such as may be used for limited purpose appliance-type computing devices.

Image presenting unit 120, operatively coupled to processor unit 112, may be a liquid crystal display (LCD) (e.g., active matrix, passive matrix and the like), a light-emitting diode (LED) display, a plasma display, a display implemented with electronic inks, or any other desirable display. Additionally, the image presenting unit may include data input configurations, which may include a GUI (not shown) that can provide an easy to use interface between a user of computing system 104 and the operating system or an application running thereon.

Input unit 118 may be used to make selections with respect to the GUI on image presenting unit 120, for example. The input unit may also be used to issue commands to processor unit 114. The input unit may include a touch sensing element, which is configured to receive input from a user's touch and to send this input to processor unit 114. Alternatively, the input unit may include a proximity sensing element, which is configured to receive input when the user's finger is within a predetermined distance from a surface of the proximity sensing element and to send this input to processor unit 114. The touch sensing element may be a touchpad or a touch screen, each of which may be configured to recognize touch points, in terms of coordinates of their positions as well as their magnitudes on a corresponding touch sensitive surface. The input unit is configured to report data corresponding to the touch points to processor unit 114, which interprets them in accordance with a corresponding programming. For example, the processor unit may initiate a task in accordance with a particular touch. The touch sensing element may be based on sensing technologies including but not limited to capacitive sensing, resistive sensing, surface acoustic wave sensing, pressure sensing, optical sensing, and/or the like. Additionally, the touch sensing element may be configured to detect a single touch point or a plurality of simultaneous touch points.

Figure 2:
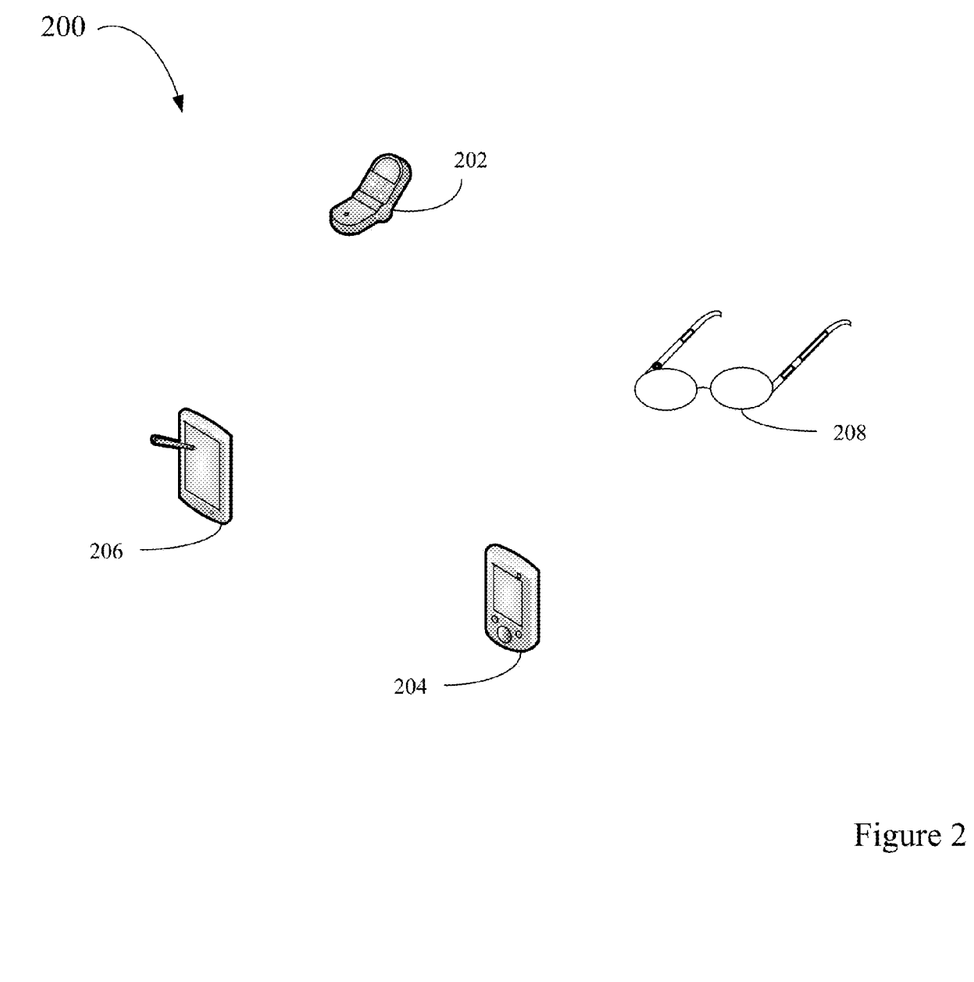
FIG. 2 illustrates exemplary embodiments of mobile devices suitable for use with aspects of the instant disclosure.

As shown in FIG. 2, user device 102 may be a small-form factor portable (or mobile) electronic device such as a cell phone 202, a personal data assistant (PDA) 204, a tablet or notebook 206, a personal media player device (not shown), a personal headset device (not shown), a video game player (not shown), a video game controller (not shown), a personal navigation device (not shown), a mobile internet device (MID) (not shown), or a hybrid device that includes any of the above functions. In one embodiment, user device 102 may be a head wearable display device 208. In case the computing system is integral to the user device, computing system 104 may correspond to a portion of the above-listed different user device embodiments. User device 102 may be capable of communicating via a wireless connection (e.g., electromagnetic radiation, infrared radiation or other wireless technology) using any type of wireless-based communication protocol, a wired connection using any type of wire-based communication protocol, or a combination of one or more wireless connections and one or more wired connections.

As used herein, the phrase "inertial sensor bias" refers to a measure of an inertial sensor's deviation from an ideal or perfect inertial sensor, and is typically determined by the inertial sensor reading at zero inertial rate, such as a zero angular rate for a perfect gyroscope or a zero acceleration rate for a perfect accelerometer, for example. As discussed herein, the phrase "bias drift" refers to the tendency of a sensor bias to change over time in response to environmental changes. As stated above, the bias drift may be affected by factors including temperature changes, electric noise, local magnetic effects, and hours of usage.

Figure 3:
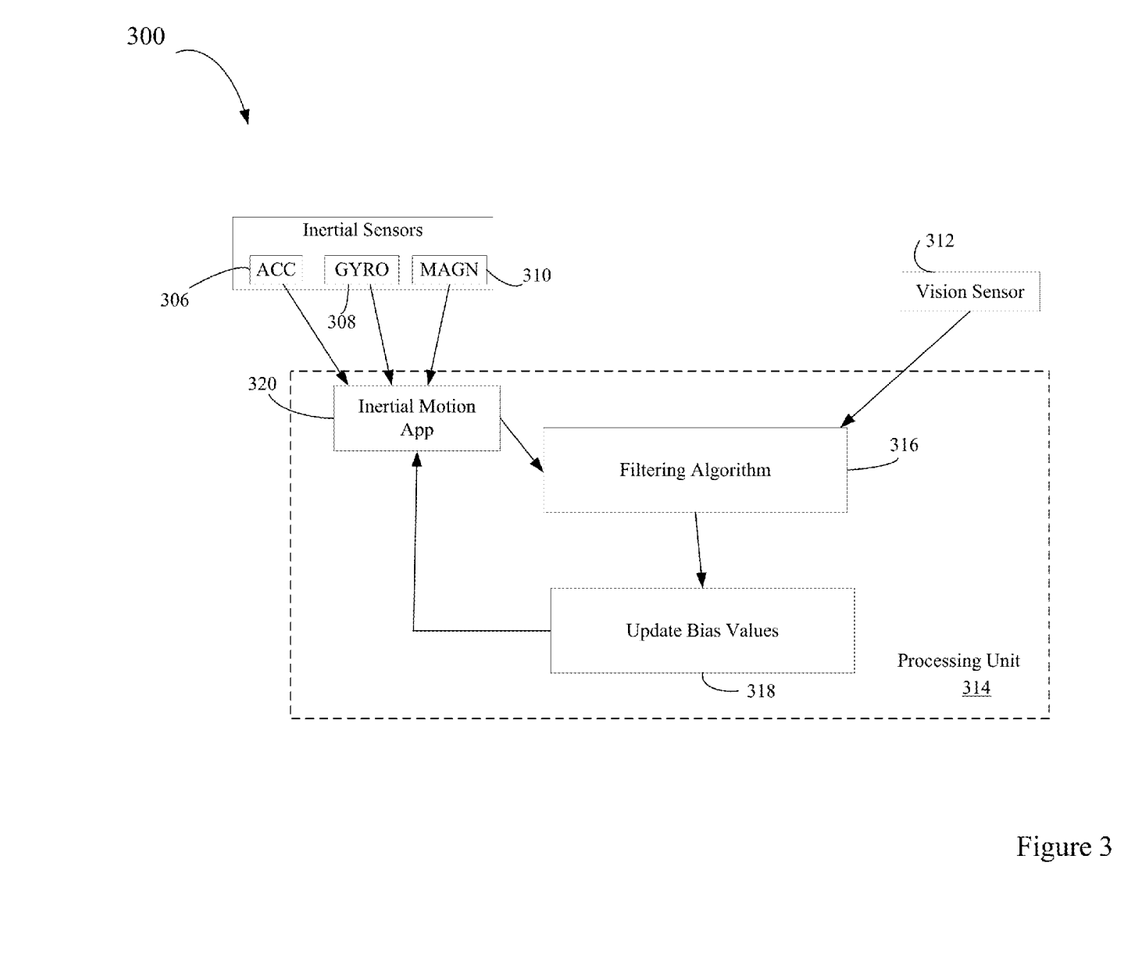
FIG. 3 is a data flow diagram depicting one embodiment of the flow of data between the elements of the device of FIG. 1.

Now referring to FIG. 3, a data flow diagram 300 depicts one embodiment of the flow of data between the elements of the device of FIG. 1. Activated sensors 306-312 output corresponding sensor measurements or data to processing unit 314 when user device 102 is in operation. Primarily, processing unit 314 is configured to utilize the received sensor data from sensors 306-312 to determine motion of the user device. In addition, processing unit 314 is configured to estimate error values in the received inertial sensor data utilizing vision data received from vision sensor 312 in order to adjust subsequent received inertial sensor data, thereby minimizing bias drift that may accumulate over time in the received inertial sensor data.

In the depicted embodiment of FIG. 3, processing unit 314 implements a data filter 316, such as a Kalman filter, for example, to estimate the bias error of inertial sensors 306-310. Vision sensor 312 can be implemented as a video camera sensor in this embodiment. As such, data filter 316 compares image or video data received from vision sensor 312 with inertial data received from inertial sensors 306-310 to estimate their corresponding inertial bias errors. By utilizing a video camera in tandem with inertial sensors, processing unit 314 can determine more precisely when user device 102 is subjected to a particular motion. Alternately, vision sensor 312 can be implemented a laser or a radar sensor.

As stated above, during operation, processing unit 314 is configured to adjust subsequent inertial sensor data received from inertial sensors 306-310 to compensate for their corresponding current bias error. As such, processing unit 314 adjusts the received inertial sensor data with stored error estimates, if any, prior to comparing the adjusted inertial sensor data with the most recent or newly received vision sensor data. Subsequently, data filter 316 processes newly received vision sensor data and the adjusted inertial sensor data to determine a new bias error estimate. In addition, for each inertial sensor, processing unit 314 calculates the covariance (i.e. uncertainty) of each estimated error and, in some embodiments, compares the covariance to a predetermined uncertainty threshold value. As such, if the calculated covariance of the estimated inertial error exceeds the threshold value, the estimated error is discarded. If the covariance is equal to or less than the threshold value, the estimated error is used in updating subsequent inertial sensor data received from inertial sensors 306-310. The threshold covariance value is based on error characteristics of the inertial sensor(s).

In one embodiment, upon deactivation of the inertial sensors 306-310, the latest evaluated error estimates are stored in the memory unit. As such, upon start-up of the user device or reactivation of the inertial sensors, processing unit 314 retrieves the last stored inertial error estimates to be used for adjusting the inertial sensor data provided by the corresponding activated inertial sensors 306-310.

Figure 4:
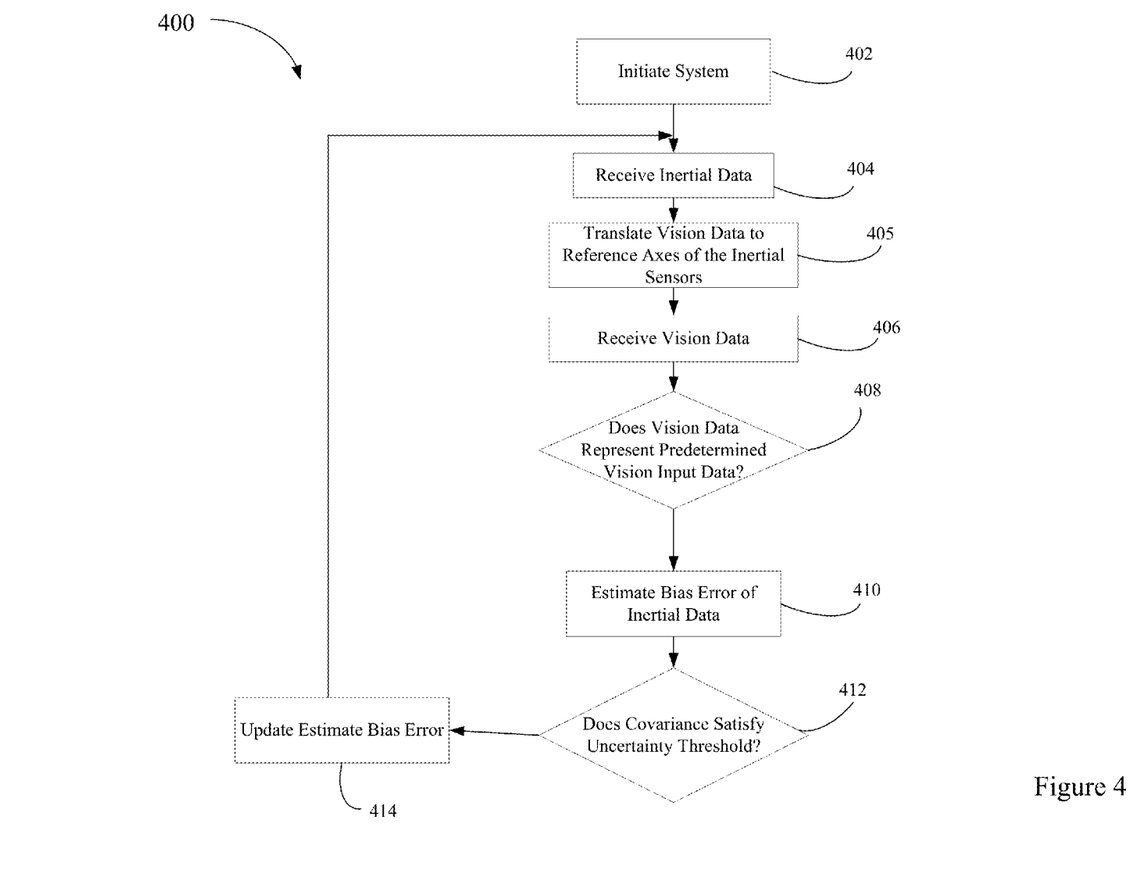
FIG. 4 is a flow diagram illustrating an exemplary method for calibrating an inertial sensor utilizing a vision sensor.

Now referring to FIG. 4, a flow diagram 400 illustrates an exemplary method for calibrating inertial sensors 306-310 utilizing vision sensor 312. The calibration of the inertial sensors serves to mitigate or at least substantially minimize their corresponding bias errors that can accumulate over time in their measured inertial sensor data. In one embodiment, the computing system is configured to monitor the input state of the vision sensor, and in response to detecting a predefined or predetermined vision input state, the computing system is configured to invoke or trigger a process of using the vision input data as a basis to calibrate one or more of the inertial sensors.

For the sake of simplicity in describing this exemplary sensor calibration method, we'll describe the calibration of only one inertial sensor, e.g., gyroscopic sensor 308, utilizing vision input data communicated by vision sensor 312. Moreover, a video camera is used as vision sensor 312. Although, gyroscopic sensor 308 may be configured to detect a three dimensional (3D) angular motion, and thus may have a bias value for each of three x, y, and z axes, for the sake of simplicity, the discussion of the calibration process will be limited to only one axis of gyroscopic sensor 308.

As shown in FIG. 4, blocks 402 through 414 correspond to the calibration of gyroscopic sensor 308 based on input data received from vision sensor 312. Upon initiation of the computing system, at block 402, gyroscopic sensor 308 senses and communicates to processing unit 314 angular motion data generated by an angular motion of user device 102, at block 404. As stated above, computing system 104 is configured to monitor the state of input data of vision sensor 312, which is communicated to and received by processing unit 314, at block 406, in order to determine whether the received vision input data represents a predetermined input data state, at block 408. Upon determination that the state of input data of the vision sensor does represents the predetermined input data state, processing unit 314 is configured to estimate a bias error of the communicated angular motion data based on the vision input data, at block 410. In one embodiment, the predetermined vision sensing input state may correspond to a predetermined input data threshold, which may be indicative of a substantial stillness of the input image data, or of a predetermined movement threshold of the device.

As stated above, the vision sensor may be a video camera used to capture a plurality of image frames during a panning of a scene, and to communicate the captured image frames to the processing unit for comparison purposes. To verify that the predetermined input data threshold is indicative of a substantial stillness of the input image data, the processing unit is configured to determine whether a frame difference between the captured image frames taken during a sufficient length of time remains substantially minimal, i.e., an image frame overlap between all of the captured image frames is substantially similar to one of the captured image frames. To verify that the predetermined input data threshold is indicative of a predetermined movement threshold of the device, the processing unit is configured to determine whether a frame overlap between at least two of the captured image frames is less than or equal to a predetermined frame overlap threshold.

In one embodiment, the bias error is estimated by a filter application or algorithm, such as a Kalman filter, for example, that compares the vision input data and the angular motion data. Gyroscopic sensors typically include three axes of freedom, none of which may correspond to panning axes of the vision sensor. As such, before comparing the vision input data and the angular motion data, the vision input data may need to be translated to the reference axes of the gyroscopic sensor, at block 405. As known to one of ordinary skill in the art, the Kalman filter is an algorithm that provides an efficient, recursive, computational solution of a least-square method utilizing sample data at discrete time intervals. As the processing unit receives sensor measurements, the processing unit may apply or implement the Kalman filter that has been seeded with data defining relationships between behavioral states of the gyroscopic sensor. As the Kalman filter receives more and more data in the form of additional inertial sensor measurements over time, the Kalman filter may then continue to improve bias error estimates, as well as a covariance for each of the estimates, which represents an error estimate uncertainty, and so forth.

In this embodiment, the Kalman filter is structured to receive angular motion data or measurements taken over time that contain random variations or other noise and inaccuracies, and to compare them to vision input data to produce values that tend to be closer to the true values of those angular motion measurements. As the error estimation process involves analyzing the vision input data and comparing it to the angular motion data, the video camera, used as the vision sensor, is utilized to capture a sequence of image frames during the motion of the user device. For each image frame, the relative position and orientation of the video camera is estimated relative to a previous image frame. As such, the error estimation process compares data representing the camera position and orientation changes between subsequent frames with the angular motion data provided by the gyroscopic sensor, to generate an estimate of the bias error of the angular motion data.

Once the bias error is estimated, at block 410, the computing system is configured to determine the uncertainty in the value of the bias error estimate, by evaluating its covariance value. As such, processing unit 314 compares the evaluated covariance value to a predetermined uncertainty threshold value, at block 412. Upon determination that the evaluated covariance value is less than or equal to the predetermined uncertainty threshold value, at block 414, processing unit 314 updates the previous bias error estimate, if any, with the newly evaluated bias error estimate to be used for adjusting the next angular motion measurement to be received by the processing unit.

As stated above, the Kalman filter continues to improve bias error estimates as more and more data is received in the form of additional inertial and vision sensor measurements over time. As such, subsequently received inertial sensing input data is adjusted based on the evaluated estimated error value. Moreover, upon receipt of new vision sensing input data, a new error value is estimated for the adjusted subsequent inertial sensing input data based on the newly received vision sensing input data.

Figure 5:
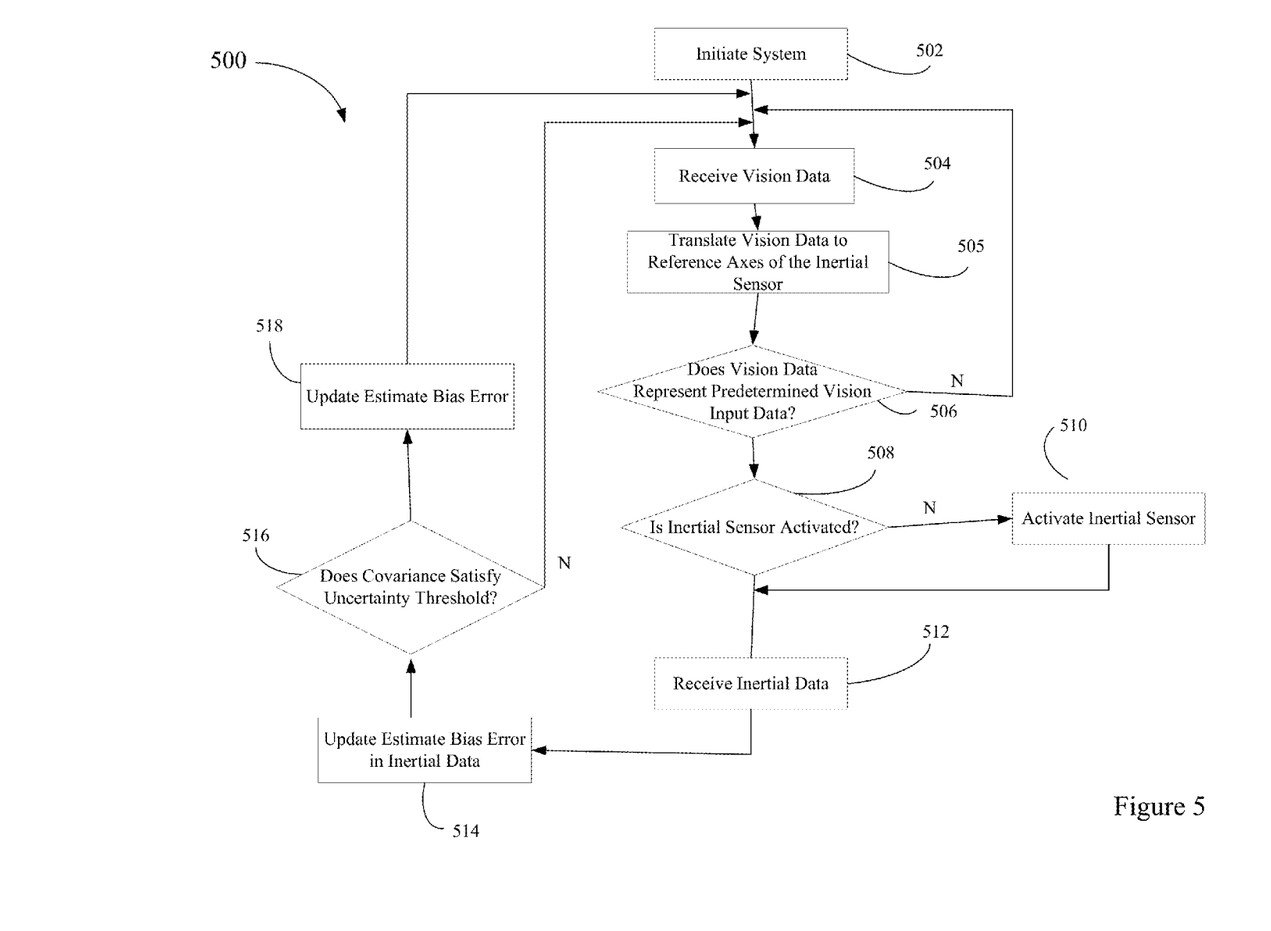
FIG. 5 is a flow diagram illustrating another exemplary method for calibrating an inertial sensor utilizing a vision sensor.

FIG. 5 is a flow diagram 500 that illustrates another embodiment of the bias error estimation or sensor calibration process. In this embodiment, one or more of inertial sensors 306-310 may be inactive, and the act of invoking the process of using the vision input data as a basis to calibrate one or more of the inertial sensors includes the function of activating the one or more inactive inertial sensors. Without loss of generality, in this embodiment, only gyroscopic sensor 308 is selected as being inactive. As shown in FIG. 5, blocks 502 through 518 correspond to the activation and calibration of gyroscopic sensor 308 based on input data received from vision sensor 312.

Now referring to FIG. 5, upon initiation of the computing system, at block 502, computing system 104 is configured to monitor the state of input data of vision sensor 312, which is communicated to and received by processing unit 314, at block 504. As discussed above in relation to FIG. 4, the error estimation process compares data representing the camera position and orientation changes between subsequent frames with the angular motion data provided by the gyroscopic sensor, to generate an estimate of the bias error of the angular motion data. Before comparing the vision input data and the angular motion data the vision input data may need to be translated to the reference axes of the gyroscopic sensor, at block 505. At block, a determination as to whether the received vision input data represents a predetermined input data state. Upon determination that the state of input data of the vision sensor does represents the predetermined input data state, processing unit 314 is configured to activate gyroscopic sensor 308, at block 510. Subsequent to its activation or switching from an off-state to an on-state, gyroscopic sensor 308 may detect angular motion of device 102 and communicates the corresponding measured angular motion data to processing unit 314, at block 512.

Once the bias error is estimated, at block 514, the computing system is configured to determine the uncertainty in the value of the bias error estimate, by evaluating its covariance value. As such, processing unit 314 compares the evaluated covariance value to a predetermined uncertainty threshold value, at block 516. Upon determination that the evaluated covariance value is less than or equal to the predetermined uncertainty threshold value, processing unit 314 updates the previous bias error estimate, if any, at block 518, with the newly evaluated bias error estimate to be used for adjusting the next angular motion measurement to be received by the processing unit. Alternately, more than one or all of the inertial sensors are activated and computing system can be configured to calibrate each one of them as their corresponding inertial measurements are communicated to the processing unit and based on the usage of their inertial measurements by particular applications.

Advantageously, the calibration process of FIG. 5 can thus operate to use the vision input data as the basis to calibrate one or more of inertial sensors 306-310 at a time when they are not being used by any application. For each of the one or more inertial sensors, this calibration process can lead the estimation of one or more bias values for, which can be stored and later used by an application when the one or more inertial sensors are active.

Figure 6:
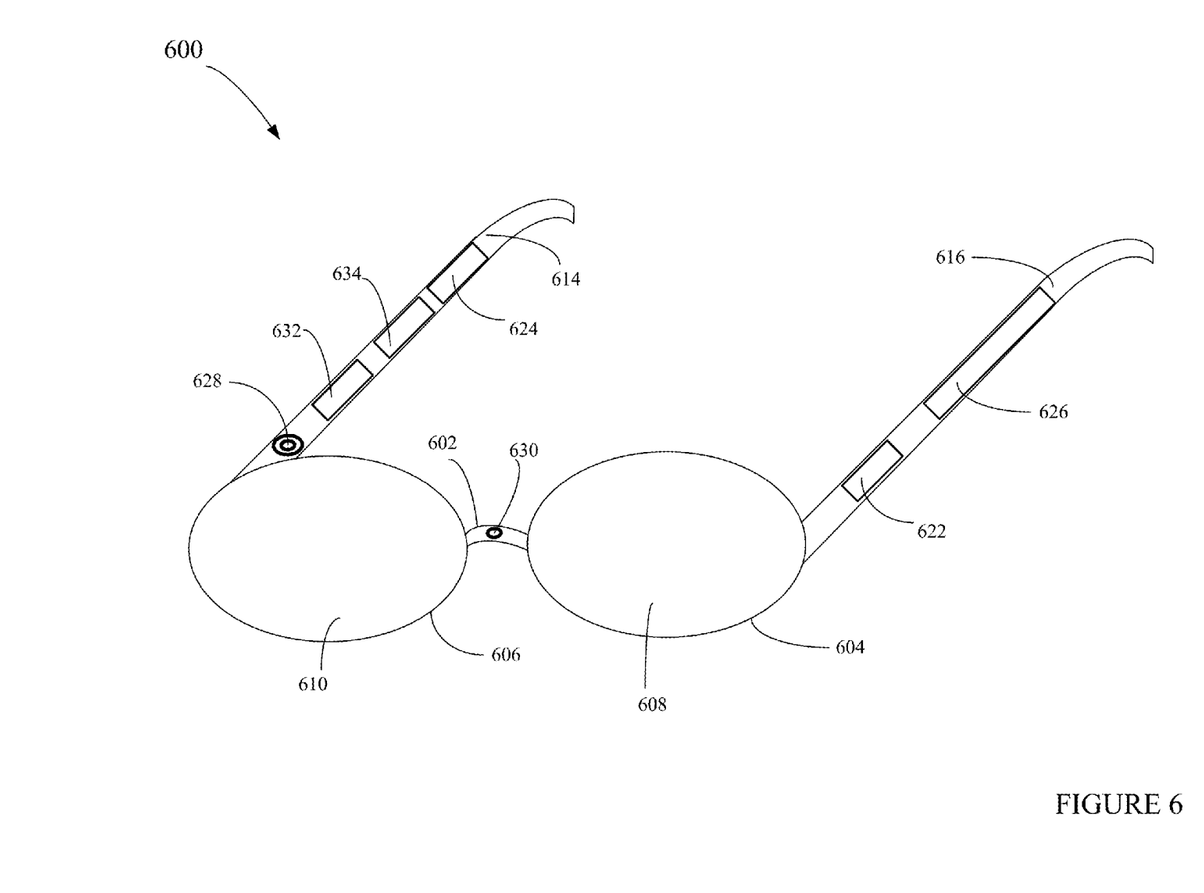
FIG. 6 illustrates an embodiment of a head-wearable display device with integrated inertial and vision sensors.

The above discussed methods and system for calibrating sensors may be implemented in various arrangements. One such arrangement may include a head wearable display device 600, as shown in FIG. 6. Head wearable display device 600, which is suitable for continuous, daily use as a wearable personal electronics device, includes a pair of glasses 602. While FIG. 6 illustrates glasses 602 as an example of head wearable display device 600, other types of head wearable display devices could additionally or alternatively be used. In addition, other non-head wearable electronic devices, such as a wrist watch, or other non-wearable electronic devices, such as a mobile phone or laptop computer could be used.

As illustrated in FIG. 6, glasses 602 comprise frame elements including lens frames 604, 606, respective lens elements or display units 608 and 610, a center frame support 612, two stems or temples 614 and 616, and planar direction input units 622, 624. The center support 612 and the two rearward extending stems 614 and 616 are configured to secure the glasses 602 to a user's face via a user's nose and ears, respectively. Each of the frame elements 604, 606, 612 and stems 614, 616 may be formed of a solid structure of plastic, metal, ceramic, etc., or may be formed of a hollow structure of similar material so as to allow wiring and component interconnects to be internally routed through glasses 602. Each of stems 614 and 616 is an example of a projection that extends away from a display element and is used to secure the display element to a user.

As shown in FIG. 6, glasses 602 further include a computing device 626 and a miniature projector unit 628 coupled to an inside-surface of stem 614 and configured to project a display onto an inside-surface of display unit 608. Computing device 626 includes a processor unit and a memory unit (not shown). By providing the memory unit with instructions directed to the present method for calibrating an inertial sensor utilizing a vision sensor, computing device 626 can carry out the functions of the present method. In one embodiment, computing device 626 may be incorporated into glasses 602. In another embodiment, computing device 626 may be a head-mounted computing device incorporated into, for example, a hat or helmet, or may be a body-mounted computing device incorporated into, for example, a waist-mounted mobile phone or personal digital assistant. Computing device 626 is coupled to planar direction input units 622, 624 and to miniature projector unit 628. As such, computing device 626 is configured to transmit input received from planar direction input devices 622, 624, and to transmit display data to miniature projector unit 628 for display on display unit 608.

Additionally, glasses 602 further include a video camera 630, a gyroscope 632, and an accelerometer 634. Glasses 602 may further include a microphone (not shown), among other possible input units. During operation, computing device 626 may monitor the inertial measurements generated by inertial sensors 632 and 634, and vision data provided by camera 630, in order to calibrate the inertial sensors as directed by particular applications.

Figure 7:
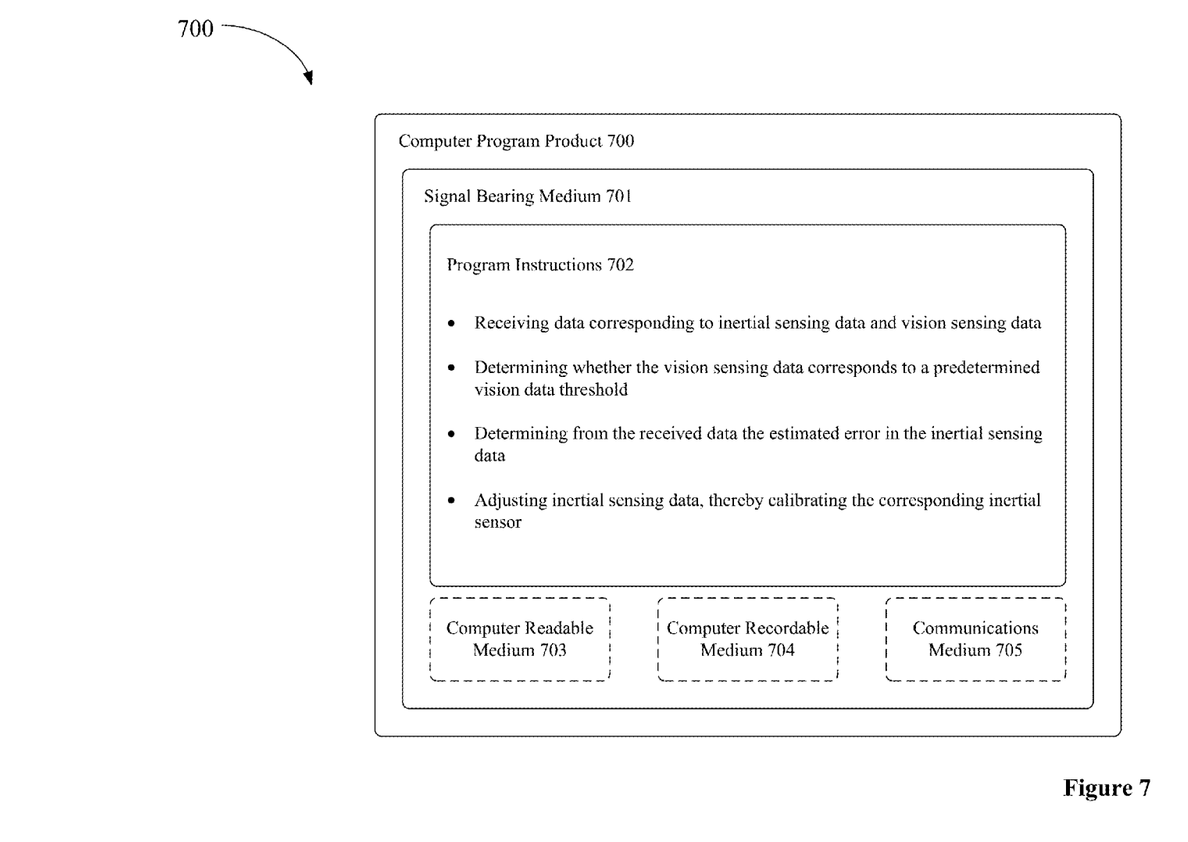
FIG. 7 illustrates a schematic diagram illustrating a conceptual partial view of an example computer program associated with the methods of FIGS. 4 and 5.

In some embodiments, the disclosed methods may be implemented as computer program instructions encoded on a computer-readable storage media in a machine-readable format. FIG. 7 is a schematic illustrating a conceptual partial view of an example computer program product 700 that includes a computer program for executing a computer process on a computing device, arranged according to at least some embodiments presented herein. In one embodiment, the example computer program product 700 is provided using a signal bearing medium 701. Signal bearing medium 701 may include one or more programming instructions 702 that, when executed by one or more processors may provide functionality or portions of the functionality described above with respect to FIGS. 1-7. Thus, for example, referring the embodiment shown in FIGS. 4 and 5, one or more features of one or more blocks 402-414 and blocks 502-518 may be undertaken by one or more instructions associated with signal bearing medium 701.

In some examples, signal bearing medium 701 may encompass a non-transitory computer-readable medium 703, such as, but not limited to, a hard disk drive, a Compact Disc (CD), a Digital Video Disk (DVD), a digital tape, memory, etc. In some implementations, signal bearing medium 701 may encompass a computer recordable medium 704, such as, but not limited to, memory, read/write (R/W) CDs, R/W DVDs, etc. In some implementations, signal bearing medium 701 may encompass a communications medium 705, such as, but not limited to, a digital and/or an analog communication medium (e.g., a fiber optic cable, a waveguide, a wired communications link, a wireless communication link, etc.). Thus, for example, signal bearing medium 701 may be conveyed by a wireless form of the communications medium 705 (e.g., a wireless communications medium conforming with the IEEE 802.11 standard or other transmission protocol).

The one or more programming instructions 702 may be, for example, computer executable and/or logic implemented instructions. In some examples, a computing device such as computing device 700 of FIG. 7 may be configured to provide various operations, functions, or actions in response to programming instructions 702 conveyed to computing device 700 by one or more of the computer readable medium 703, computer recordable medium 704, and/or communications medium 705.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

We claim:
1. A method comprising:
during a session in which a first application is open on a wearable device:
receiving inertial data indicating movement of the wearable device from an inertial sensing unit integral to the wearable device:
receiving input image data from an image sensing unit integral to the wearable device;
determining when the received input image data represents a predetermined input state of the image sensing unit;
upon determination that the received input image data represents the predetermined image sensing input state: (a) comparing, at the wearable device, the inertial sensing input data and the input image data; and (b) estimating, at the wearable device, an error value in the inertial sensing input data based on the comparison of the inertial sensing input data and the input image data;
determining an inertial-data adjustment for subsequently received inertial data from the inertial sensing unit based on the estimated error value; and
storing the inertial-data adjustment in a memory of the wearable device;
ending the session of the first application, wherein the inertial-data adjustment in the memory of the wearable device after ending the first session;
subsequently initiating a session of a second application on the wearable device, wherein the second application utilizes inertial data; and
in response to initiating the session of the second application that utilizes inertial data, retrieving the inertial-data adjustment from memory and applying the inertial-data adjustment to at least some inertial data generated by the inertial sensing unit during the session of the second application.
2. The method of claim 1, wherein determining when the received input image data represents the predetermined image sensing input state comprises:
determining when the predetermined image sensing input state corresponds to a predetermined input data threshold.

3. The method of claim 2, wherein the predetermined input data threshold is indicative of a substantial stillness of the input image data.
4. The method of claim 2, wherein the predetermined input data threshold is indicative of a predetermined movement threshold of the device.
5. The method of claim 1, further comprising:
receiving a second subsequent inertial sensing input data from the inertial sensing unit;
adjusting the received second subsequent inertial sensing input data based on the estimated error value;
receiving first subsequent input image data; and
determining a subsequent estimated error value of the adjusted second subsequent inertial sensing input data based on the first subsequent input image data.
6. The method of claim 1, wherein the inertial sensing unit is one of a gyroscope, an accelerometer, and a magnetometer.
7. The method of claim 1, wherein the computing system comprises:
a memory unit storing program instructions executable to perform the method; and
a processor unit operatively coupled to the memory unit, the inertial sensing unit, and the image sensing unit, and configured to execute the method.
8. The method of claim 1, wherein:
the inertial sensing unit is operable to provide the inertial sensing input data, which represents sensed inertial movements of the wearable device; and
the image sensing unit is operable to provide the input image data, which represents captured still images or video images.
9. The method of claim 1, wherein the device is a head-wearable display device, and includes a display element for displaying graphical images, and an image presenting unit for presenting the graphical images on the display element.
10. A method comprising:
determining that no application running on a wearable device is utilizing data generated by an inertial sensing unit integral to the wearable device;
in response to determining that no application is utilizing data generated by the inertial sensing unit:
receiving input image data from an image sensing unit integral to the wearable device, and determining when the received input image data represents a predetermined input state of the image sensing unit;
operating the inertial sensing unit to receive inertial data indicating movement of the wearable device;
comparing, at the wearable device, the inertial data and the input image data, and estimating, at the wearable device, an error value in the inertial data based on the comparison of the inertial data and the received input image data; and
adjusting first subsequently received inertial sensing input data from the inertial sensing unit based on the estimated error value, thereby reducing accumulated error of the inertial sensing unit.
11. The system of claim 10, wherein determining when the received input image data represents the predetermined image sensing input state comprises:
determining when the predetermined image sensing input state corresponds to one of a predetermined input data threshold.
12. The system of claim 10, wherein the predetermined input data threshold is indicative of a substantial stillness of the input image data.

13. The system of claim 10, wherein the predetermined input data threshold is indicative of a predetermined movement threshold of the device.

14. The system of claim 10, wherein the inertial sensing unit is one of a gyroscope, an accelerometer, and a magnetometer.

15. The system of claim 10, wherein the computing system comprises:
   a memory unit for storing program instructions executable to perform the method; and
   a processor unit operatively coupled to the memory unit, the inertial sensing unit, and the image vision sensing unit, and configured to execute the method.

16. The system of claim 10, wherein:
   the inertial sensing unit is operable to provide the inertial sensing input data, which represents sensed inertial movements of the device; and
   the image sensing unit is operable to provide the input image data, which represents captured still images or video images.

17. The system of claim 10, wherein the device is a head-wearable display device, and includes a display element for displaying graphical images, and an image presenting unit for presenting the graphical images on the display element.

18. A non-transitory computer readable storage medium containing program instructions that cause a computing system to perform a method comprising:
   determining that no application running on a wearable device is utilizing data generated by an inertial sensing unit integral to the wearable device;
   in response to determining that no application is utilizing data generated by the inertial sensing unit:
      receiving input image data from an image sensing unit integral to the wearable device, and determining when the received input image data represents a predetermined input state of the image sensing unit;
      operating the inertial sensing unit to receive inertial data indicating movement of the wearable device;
      comparing, at the wearable device, the inertial data and the input image data, and estimating, at the wearable device, an error value in the inertial data based on the comparison of the inertial data and the received input image data; and
   adjusting first subsequently received inertial sensing input data from the inertial sensing unit based on the estimated error value, thereby reducing accumulated error of the inertial sensing unit.

* * * * *